United States Patent [19]
Fontenla

[11] Patent Number: 5,469,824
[45] Date of Patent: Nov. 28, 1995

[54] ELECTRONIC SYSTEM FOR CONTROLLING TIMING SIGNALS IN AN INTERNAL COMBUSTION ENGINE

[75] Inventor: Juan M. Fontenla, Louisville, Colo.

[73] Assignee: Garci, Inc., Huntsville, Ala.

[21] Appl. No.: 206,329

[22] Filed: Mar. 7, 1994

[51] Int. Cl.$^6$ .................................................. F02P 5/15
[52] U.S. Cl. ............................................. 123/416; 123/426
[58] Field of Search ................................... 123/414, 415, 123/416, 417, 426; 364/431.04

[56] References Cited

U.S. PATENT DOCUMENTS

| | | | |
|---|---|---|---|
| 3,696,303 | 10/1972 | Hartig | 123/416 X |
| 4,273,089 | 6/1981 | Maier | 123/417 |
| 4,355,613 | 10/1982 | Rode et al. | 123/414 |
| 4,814,704 | 3/1989 | Zerrien, Jr. et al. | 123/416 X |
| 4,893,244 | 1/1990 | Tang et al. | 123/416 X |

Primary Examiner—Tony M. Argenbright
Attorney, Agent, or Firm—John C. Garvin, Jr.; James E. Staudt

[57] ABSTRACT

Electrical pulses are provided to the system as each piston of an automotive engine reaches its top dead center position during a compression stroke. The system measures and stores the time TP which is equivalent to the elapsed between a first and second pulse. The system then measures the current cycle time, TC which is the time accumulating after the second pulse. To this time TC the system instantly adds a predetermined and constant (but adjustable) time advance period, TA. The time TP is fed to a comparator for comparison to the total of the time TA plus the accumulating time TC. When the total of time TA plus the accumulating time TC reaches the value of the time TP, the comparator generates a pulse to fire an automotive ignition coil. When a third pulse arrives the system stores the new value reached by TC as the new TP for the following cycle. Thus, the result of this addition of TA to TC is continuously compared with the stored value of TP, and when the two values coincide ignition is again triggered.

20 Claims, 2 Drawing Sheets

ELECTRONIC SYSTEM FOR CONTROLLING TIMING SIGNALS IN AN INTERNAL COMBUSTION ENGINE

BACKGROUND OF THE INVENTION

1. Field of the Invention

It is well known that automobiles typically utilize what is commonly referred to as four cycle internal combustion engines wherein each moving compression element travels repeatedly through four strokes, designated as intake, compression, power and exhaust. The compression element is typically a piston which reciprocates within a cylinder, but may vary in configuration such as in a Wankel type engine wherein the compression element is a specially configured rotor.

It is also well known that the proper timing of the ignition spark is critical for optimum performance of such internal combustion engines which are based on an ignition spark for igniting the fuel-air mixture. Experience has shown that optimum engine performance is achieved when the spark which triggers ignition occurs before the piston reaches the top dead center (TDC) position of its travel, as it completes the compression stroke. When an ignition spark precedes the piston reaching TDC, this is commonly referred to as timing advance. In modern engines complex mechanical devices and elaborate electronic and computerized systems have been utilized to adjust the timing in response to various criteria. Engine speed is the most critical criteria requiring changes in timing advance and is also the criteria requiring the greatest change in timing advance. To a lesser degree other criteria must also be considered. These include parameters such as engine load, engine temperature, quality of fuel, fuel-air ratio, ambient conditions, emission control requirements, etc. In the light of these requirements, the present invention relates to a system which provides a simple and inexpensive electronic means for precise control of the ignition timing advance in internal combustion engines. This system is based on the measurement and comparison of time elapsed between consecutive TDC piston positions, and the addition of an appropriate time value.

2. Description of Related Art

Heretofore one typical means for advancing ignition timing in relation to engine speed is commonly referred to as a centrifugal advance system, wherein the shaft of an ignition distributor is provided with two or more weights which are biased by springs. As the speed of the distributor shaft increases the weights are forced outwardly against the bias of the springs, and through a mechanical linkage the ignition timing is advanced as the rotational speed of the distributor shaft increases. These weights, springs and mechanical linkages must be manufactured with precision and must be carefully calibrated. Because of mechanical friction, changing spring constants and engine speed variations, this system is not completely accurate in principle and becomes less so after use. For example, as a result of wear, friction increases in the mechanical parts; and with normal use and exposure to extreme temperatures, the elastic constants of the springs change from original design specifications. Also, servo mechanical or electronic systems require an input which is sensed before correction of the input is introduced. This results in a "searching" action which is repeated until the optimum condition is reached. Mechanical servo systems are also unstable because of inertial effects. Accordingly, it will be readily appreciated that systems of this type are basically lacking in accuracy over large ranges of engine speed and extended use, are very expensive to manufacture, and require costly periodic maintenance.

A more recent development for improving the ignition timing accuracy is the computer controlled system. In these systems the computer receives synchronization pulses from the distributor's pick-up coil, computes the engine speed and by utilizing special programming and tables, computes an the optimum advance angle from inputs relating to engine performance parameters. Such systems are typically quite accurate, but involve complicated electronic equipment, expensive parts and sensors. Custom programming and careful studies of the optimum angle for each application of the computer tables and programs is also required. Typically, if a system of this type fails, the original program and tables must be replaced, because they are not interchangeable between models. Also, later adjustments to the ignition timing are not possible without reprogramming. Replacement of expensive computer parts may also be required. Further, the accuracy of this method is only as good as the initial program and tables. Original accuracy can be substantially degraded if fuels having widely varying characteristics are used or if the automobile is driven at speeds, altitudes or temperatures outside those for which the computer was initially programmed. Typically, in such computer systems, a fixed angle of advance is built into the distributor position for use in the event a computer malfunction makes it necessary to eliminate the computer and operate in a so-called "limp mode".

Examples of related prior art are found in the following U.S. Patents: U.S. Pat. No. 3,888,220 to Bigalke et al. which relates to performance curve control of the ignition angle advance in an internal combustion engine; U.S. Pat. No. 4,122,807 to Hosaka et al. which utilizes a reference angle signal generator to detect the angular position of a crankshaft and in response thereto generates reference angle signals corresponding to the reference angle positions such as top dead center piston positions. The patent utilizes divided signals to produce ignition spark triggering signals conforming to advance control signals applied as inputs thereto; U.S. Pat. No. 4,138,976 to Crall which utilizes a pair of magnetic pickup devices, each of which generates signals at a frequency representative of engine speed; U.S. Pat. No. 4,852,536 to Maier et al. which utilizes a computing means which controls the sparks to a plurality of cylinders, and is based upon the identification of the timing of cylinder number one; U.S. Pat. No. 4,917,064 to Kodoma et al. which is directed primarily to a cylinder discriminating reluctor; U.S. Pat. No. 4,959,996 to Akasu which uses a shortened output pulse of a prescribed reference cylinder of the engine, for comparison to the longer pulses generated by the remaining cylinders, and utilizes the period between consecutive output pulses in conjunction with a ratio calculator and other electronic components to control the ignition advance angle of an engine; U.S. Pat. No. 5,046,468 to Erhard which utilizes tangentially adjacent tooth segments as inductive pickup devices; and U.S. Pat. No. 5,056,485 to Kobayashi et al. which provides a rotor plate formed with slits for detecting angular cylinder position.

It is apparent that none of the above referenced patents suggests a system similar to that of applicant nor do they overcome the shortcomings of the prior art with a simple and inexpensive system, which is disclosed in detail hereinafter.

SUMMARY OF THE INVENTION

The electronic timer system, which is the subject of this invention, is an extremely simple and accurate system for delivering a fixed "time" advance interval directly within the ignition system. Implementation of this system in automotive engines eliminates the need for previous "angular" advance systems (mechanical or electronic). The basic input to the present system is the firing pulse from a conventional pickup coil device. However, any other equivalent pulse, can be used as an input. For example, a conventional but outdated ignition system which utilizes contact points to initiate an ignition spark may be utilized to actuate the present system.

The system described herein is not computer controlled or programmed, but is a fixed electronic device which measures and stores the time of a previous cycle, TP (of an internal combustion automotive engine as it completes one complete firing cycle) in electronic form. It then continuously measures a current cycle time, TC, (from the last TDC), and adds instantaneously the desired "advance time", TA to the current cycle time TC. In this addition process it is to be understood that the time TA may be a predetermined constant selected for use with a particular engine and that as the cycle proceeds the duration of the current cycle time TC increases. The time TA can be modified depending upon engine and ambient conditions as will be described hereinafter. Accordingly, the addition process progresses as the time TA combines additively with progressing time TC. When the progressing time, TC reaches a point at which the addition of times TA and TC is equal to the time of the previous cycle TP a comparator triggers an ignition spark. This provides a very precise timing advance value since the stored time TP can change very little between consecutive cycles, because of the mechanical inertia of the engine. Thus, at all engine speeds, the system delivers an optimum ignition advance which is essentially insensitive to the engine response, because it is always based on a fixed advance time. This contrasts with servo mechanical or electronic systems which require an input which is sensed before correction of the input is introduced. The present system eliminates the difficulties inherent in these previous systems. And it may be easily and accurately adapted for use with engines having varying timing advance needs. Having established the basic timing advance required as a result of engine speed, additional inputs may easily be fed to the system. These inputs relate to the many parameters which must be considered in controlling timing advance under all engine operating conditions. Examples include inputs responsive to: engine load, engine temperature, ambient pressure, humidity, pollution control, etc. Timing corrections to meet such operating conditions are relatively small when utilizing the present system. These smaller timing advance corrections are implemented by the addition of electronic controls actuated by sensors which respond to the desired operating parameters. These controls may be strategically placed in the disclosed circuitry to provide the desired corrections. This system can also operate in computer controlled engines. In this case, the basic advance is provided by the present system and the computer needs only to compliment the basic advance values. This operation is greatly simplified, in that it is accomplished without regard to synchronous timing as relates to the engine rotation. Moreover, because of the independent operation of the basic system, a computer malfunction would result in relatively minor changes to the timing advance values.

DESCRIPTION OF THE PREFERRED EMBODIMENT

Figure 1:
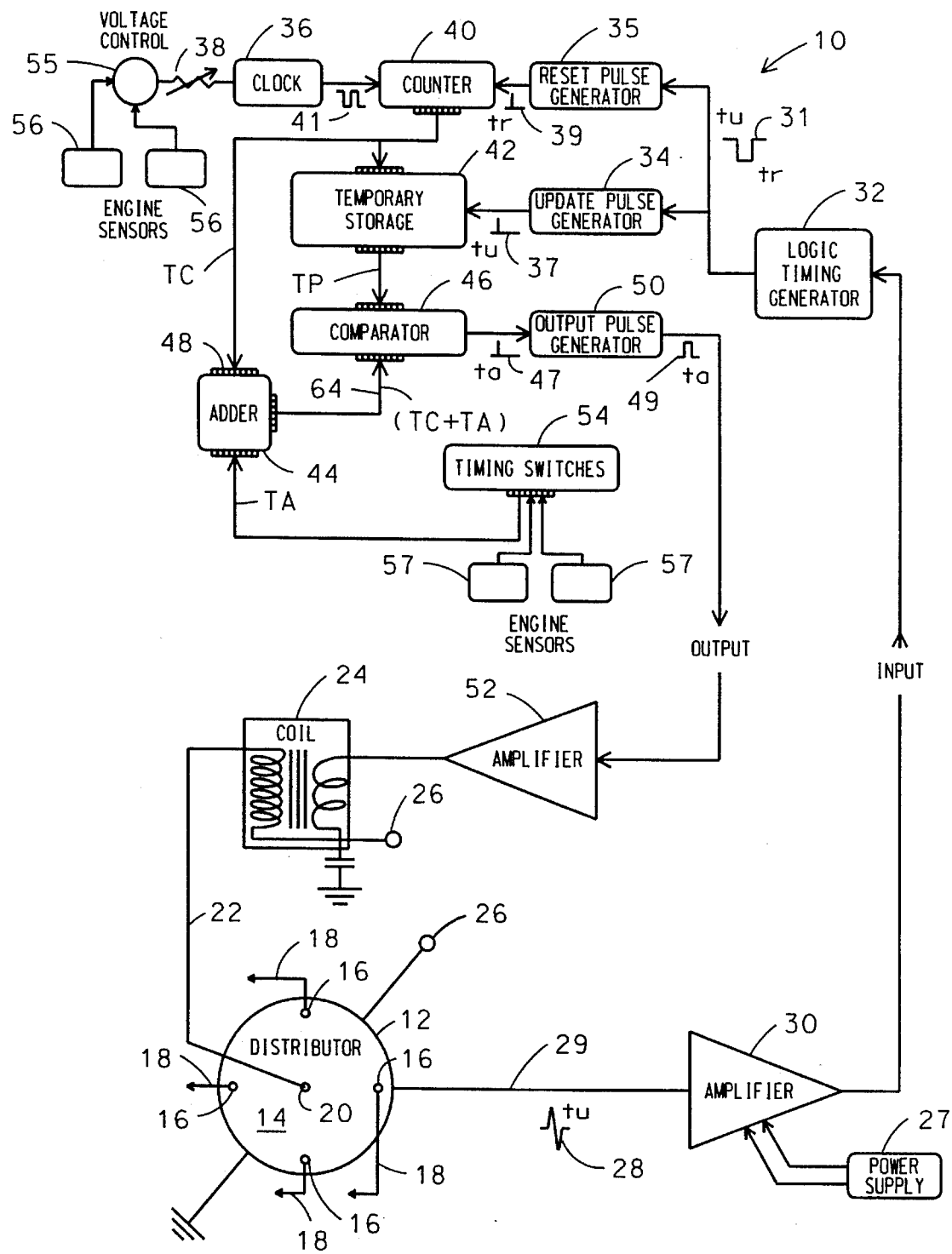
FIG. 1 is a block diagram of a preferred embodiment of the invention illustrating the major components of the system and the relationship thereof to components of an automotive ignition system.

Broadly stated, the invention is an electronic timing system for use on automotive internal combustion engines. The present system may be operated in conjunction with a conventional automotive ignition apparatus in lieu of any other timing advance system. Basically, such an automotive ignition apparatus includes a distributor and an ignition coil. The distributor includes a rotor and a pickup coil. In operation a pulse is created by the distributor as the rotor passes the pickup, the pulse triggers the ignition coil which sends an electrical current to a spark plug which provides the spark for ignition of a fuel/air mixture within the combustion chamber of the engine. Typically, this pulse is timed to occur in advance of the time at which a piston of the engine, passes through the top dead center position (TDC), during a compression stroke within a cylinder of the engine. As is well known, timing angle of the ignition spark is critical, and must be varied in accordance with many parameters relating to operation of the engine. While other factors must also be considered, the most significant parameter relating to proper ignition timing angle is engine speed. As is also well known, the timing angle of the ignition spark with respect to the top dead center position of the engine piston must be advanced as the engine speed is increased. In plotting a basic timing angle curve of engine speed as compared to an appropriate amount of timing advance angle (without regard to considerations other than engine speed), it will be seen that the curve approximates a straight line wherein the amount of timing advance angle would be directly proportional to the speed of the engine. The present electronic ignition timing advance system provides the required timing advance angle values which are directly proportional to engine speed. These values are delivered with unprecedented precision and provide a solid foundation for controlling a full range of timing advance angle values to meet all conditions of engine operation. Ideal advance curves include timing advance angle values required to accommodate engine speed as well as parameters in addition to engine speed. These curves illustrate the fact that timing requirements deviate a relatively small amount from the straight line advance speed related curve.

The present ignition timing advance system may be actuated by the pulse produced by any modern automotive ignition apparatus.

The following is a basic description of the present system.

Based on a first pulse, which is provided by a conventional automotive ignition system, the present system accurately measures and stores the time elapsed until a second pulse occurs. This stored time is referred to as the elapsed time of the "previous cycle" and is designated TP. The system then measures what is referred to as the "current cycle time", TC, which is the time accumulating after the second pulse. To this time TC, the system instantly adds a predetermined and constant time value which is referred to as "advance time" and is designated TA. The time TP is fed to a comparator for comparison to the total of the time TA plus the time TC. When the total of TA plus TC reaches the value of TP, a comparator provides a signal to fire the ignition spark. When a third pulse is received, the system stores the accumulating value of TC as the next value of TP to be used in a new cycle of operation. Thus, the result of this addition of TA to TC is continuously compared with the stored value of TP, and when the two values coincide ignition is triggered. It will be noted therefore that during a steady state situation wherein the engine is operating at a constant speed, the time TP becomes constant, as the continuously accumulating time TC is reset to zero at every input pulse. If the engine speed changes the system updates the change in the TP, as the cycle repeats. Consequently, the value of TC at which ignition occurs will vary accordingly, and ignition will always occur at the time when TC is equal to TP–TA, that is approximately the value of the time TA before the TDC pulse is received.

Referring now to FIG. 1 of the drawings, the electronic timing advance system, which is the subject of this invention, is illustrated by a block diagram and is referred to generally by the numeral 10. The system 10 is actuated by a pulse 29 typical of that generated by a conventional internal combustion engine distributor 12. Distributors of this type have a pulse generating pickup coil which is actuated by an engine driven rotor having magnetic elements equal to the number of engine cylinders. As the rotor turns, a pulse is generated each time a magnetic element passes close to the pickup coil. Each pulse is triggered at a time in coincidence with the top dead center position of a piston within each cylinder of the engine. As with typical four cycle engines, the rotor is geared to turn at one half the speed of the engine rotation to provide an ignition spark only during the compression stroke of the piston. As shown, the distributor is viewed from the top to illustrate a distributor cap 14 along with four spark plug wire terminals 16, one for each cylinder of the engine. Each wire terminal 16 is provided with a spark plug wire 18 for attachment to the spark plug of a conventional internal combustion engine (not shown). A center terminal 20 is adapted for reception of a coil wire 22 which conducts high voltage pulses from a conventional ignition coil 24 to the distributor 14 for distribution to the wire terminals 16, in accordance with the firing order of the engine. The ignition coil 24 and the distributor 14 are powered by an electrical power supply 26 which is typically an automotive battery. In a typical ignition system the coil 24 would by triggered directly by the pulse generated by a pickup coil within the distributor. However, in accordance with the present invention, the pulses from the pickup coil within the distributor are passed through a series of electronic components for the purpose of providing an appropriately timed output pulse to the ignition coil 24, in a manner to be described hereinafter. This timing advance system thus eliminates the need for an internal timing advance apparatus such as is typical in such distributors. Accordingly, when utilizing the present system, the distributor may be manufactured without a typical ignition advance mechanism. On existing distributors the advance mechanisms may easily be replaced by the present system. As illustrated in the drawing, the electronic timing advance system initially receives a TDC pulse 28 generated by the conventional distributor 14 through a line 29. In use of the present system, the distributor is installed to produce each pulse exactly at TDC, and need never be readjusted. As is well known in use of conventional ignition timing apparatus, adjustments are made by mechanical rotation of the distributor, and the initial timing value typically includes some degree of advance. The pulse 28 is amplified by an amplifier 30, which is of conventional design and consists of an opto-coupler chip NTE 3090, two resistors and a diode. A system power supply 27 is shown as a feed into the amplifier 30 from which power to the components of the system is provided through conventional wiring schemes (not shown). The power is regulated within the power supply by a voltage regulator chip 6V1A and 3 capacitors. After amplification, the pulse 28 proceeds to trigger a logic timing generator 32. The output of the logic timing generator 32 is a fixed duration pulse 31 starting at reception of each of the distributor pulses 28, and is fed to an update pulse generator 34 and to a reset pulse generator 35. The update pulse generator 34 is adapted to be responsive to the leading edge "tu" of the pulse 31. The reset pulse generator 35 in turn responds to the trailing edge "tr" of the pulse 31. The pulse 31 thus provides two actuating signals with a predetermined time lapse therebetween. While this arrangement is convenient, it will be understood that separate components may also be utilized to provide each of the actuating signals. The generators 32, 34, 35, as well as an output pulse generator 50 which will be described hereinafter are well known in the art. Each of these generators includes one monostable multivibrator. A chip 4538, includes two such multivibrators, thus providing multivibrators for two generators. Each generator also includes one resistor and one capacitor. It is noted that most chips utilized in this system are integrated circuit of the CMOS series, and are manufactured as standard components by many companies, examples of which include "Motorola" "Siemens", "Texas Instruments" etc. It is, of course, within the skill of the art to replace any listed chips with equivalent functional chips, for example, with chips of the TTL series 7400. All components used in the construction of this system are standard off the shelf items. The system time is measured by a clock 36 which provides the necessary time step for operation of the system. This clock 36 is an astable multivibrator the frequency of which can be adjusted through a potentiometer 38, and also by supply of an external voltage. Thus if timing variations are required, signals from engine sensors 56 are fed to the clock 36 through a voltage control 55. This arrangement provides an effective means to adjust ignition timing in accordance with varying engine conditions such as load, temperature, etc. The clock type is well known in the art and consists of an oscillator chip 944M, five resistors, two capacitors, a diode Zener 3.3V. Pulses 41 from the clock 36 are fed into a binary counter 40. The counter 40, which consists of one binary counter chip 4040, is reset to zero by the pulses 39 from the reset pulse generator 35, at the time "tr". Thus the counter's output represents an accumulating time TC from the last TDC pulse (minus the small difference between "tr" and "tu"). The counter's output (which represents a binary number) feeds simultaneously into a temporary storage 42 and an adder 44. The time controlled temporary storage unit 42 consists of a latch that stores its input (a binary number indicating the value of TC), and reflects the binary number to its output at the times when it receives the pulse 37 from the update pulse generator 34, i.e., at the time "tu". Thus, the temporary storage 42 maintains an output which actually represents time TP which is equivalent to the time elapsed between the last two TDC pulses (minus the very small difference between "tr and "tu"). The temporary storage unit 42 is a type well known in the art and consists of two, quad-D latch, chips 4042. The output of the temporary storage 42 feeds into one of the inputs of a comparator 46. The comparator 46 is of well known design, and consists of two XOR gate chips 4519 and a 1 NAND gate chip 4068. The other input to comparator 46 is an output from an adder 44, also of well known design, and which consists of two full adder chips 4008. It will be noted that the numeral 48 adjacent the adder 44 symbolizes a typical connector, of the type having several pin connectors which are utilized on the adder 44 as well as on several other of the electronic components disclosed herein. The adder 44 adds a fixed binary number to the output of the counter 40. This number represents the advance time TA which is selected by a set of timing switches 54. While timing for the temporary storage 42 and the adder 44 are provided by the clock 36 via counter 40, it would be within the skill of the art to provide other timing methods such as internally time controlled adder and storage components. The timing switches 54 determine the advance time TA in units of the clock period, and provide a digital way to set up the value of TA. The switches may be operated manually for initial timing adjustments, or for timing changes required by operational conditions. Such conditions may include significant changes in fuel characteristics, or in operational environmental conditions such as altitude or temperature. The switches may also be operated in response to engine requirements which are detected and transmitted by engine sensors 57. As with the engine sensors 56, the engine sensors 57 may be utilized to detect varying engine conditions such as load, temperature, etc. However, timing variations of considerable extent are typically provided by use of the switches 54. The output pulses 47 from the comparator 46 provide the basis for the accurate timing of the pulse 47 (at the time when TC+TA= TP). The pulses 47 are fed into the output pulse generator 50 which produces an optimum or conditioned pulse shape needed for actuation of the conventional ignition coil or its equivalent. The output from the output pulse generator 50 is amplified by an amplifier 52 and fed directly to the coil 24 which provides high voltage ignition pulses for distribution to the spark plugs of an engine. The amplifier 52 is of conventional design and consists of two transistors 3704, a transformer 1:2, six resistors and two capacitors.

Figure 2:
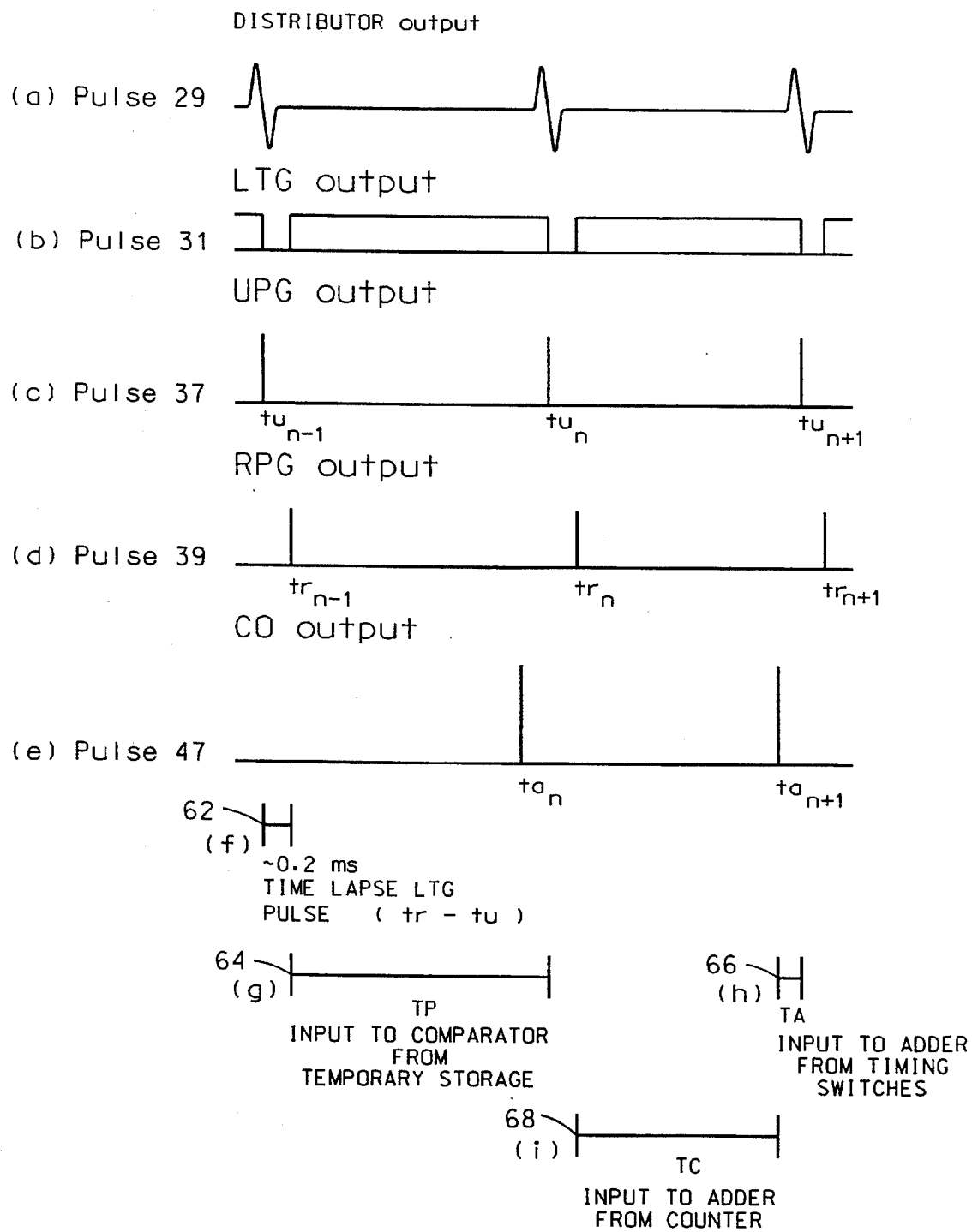
FIG. 2 includes time/voltage graphs illustrating relationships of outputs of basic components of the system to time values critical to operation of the system.

In operation of the device it will be appreciated that there is not a single chain of occurrences, but rather several sequences are occurring simultaneously. It is the interaction of the sequences which provides the desired result. Reference is made to FIG. 2(a), (b), (c), (d) and (e) wherein pulse waveforms 29, 31, 37, 39 and 47, previously identified in FIG. 1, are illustrated in expanded form and are arranged in accordance with elapsed time. Basic time values indicated by numerals 62, 64, 66 and 68 are also illustrated in FIG. 2(f), (g), (h) and (i). These time values are arranged so as to coincide in terms of time with the above mentioned waveforms.

Sequences of the System

The times set forth hereinafter in the descriptions of the sequences are applicable to a four cylinder, four cycle engine. The various sequences are as follows:
a) The synchronization chain. This chain is only dependent on input from the system and does not receive input from other sequences. However, this sequence provides input that triggers other events and alters the other sequences (for synchronizing them with the engine state). Sequence explanations and steps are as follows:
 1. Assuming that the engine is turning at constant speed of 825 RPM, and delivering the TDC synchronization pulses 28 from the engine distributor 14 to the input of the system, each input pulse occurs every 36.5 ms.
 2. This input is processed by the logic timing generator 32 and triggers the rectangular pulse 31. This pulse 31 which starts at TDC, corresponds to a drop in the voltage and has a width of 0.2 ms as indicated by reference numeral 62, in FIG. 2. It is noted that in operation of the system the duration of pulse 31 must be less than the time between the TDC pulses from the distributor 14, and must also be shorter than the time TA.
 3. Pulse 31 is fed simultaneously into the update pulse generator 34, and the reset pulse generator 35.
 4. The update pulse generator 34 is triggered by the leading edge "tu" of the signal 31. This update pulse generator 34 produces a very short rectangular pulse 37. Pulse 37 is a rise in the voltage, occurs at TDC, and has a width of 0.02 ms.
 5. The reset pulse generator 35 is triggered by the trailing edge "tr" of pulse 31. The reset pulse generator 35 produces a very short rectangular pulse 39. This pulse is a rise in the voltage, occurs at 0.2 ms after TDC, and has a width of 0.02 ms. Thus, the single pulse 31 provides two actuation signals.
 6. The signals 37 and 39 are used by the temporary storage 42 and the counter 40 respectively to perform specific control tasks on other sequences of events, to be described hereinafter.
b) The time marking chain. This sequence is continuous and independent of the synchronization chain and of the state of the engine. (The frequency of the clock may be changed by an analog input in the form of a controlled voltage or a potentiometer variation as may be convenient for changing the advance time, but this change is not part of the main sequence of events). Sequence explanations and steps are as follows:
 1. The clock 36 is continuously oscillating and delivering rectangular pulses 41 to the counter 40.
c) The current elapsed time measuring, and target time setup, chain. This sequence also occurs continuously, but is controlled by interaction between the previous a, and b sequences. The time marking chain ( sequence "b") provides the pulses to be counted, and the synchronization chain (sequence "a") provides the reset signal 39 which defines a new zero time at 0.2 ms after each TDC. Sequence explanations and steps are as follows:
 1. The voltage rise of signal 39 from the reset pulse generator 35 is fed into a reset pin as is typically provided on counter 40. This forces the digital 8 bit output of the counter (and its state) to the binary zero (i.e. all 8 bits go to zero voltage). After the voltage of signal 39 drops again to zero, the counter 40 starts and maintains a digital output (8 bits in the current implementation) which is a binary representation of the current elapsed time (i.e., the time elapsed from the last reset of the time counter 40, as will be described later). This time corresponds to the time from the last TDC minus 0.2 ms, is measured in units of the clock period and is the "current elapsed time" of TC.
 2. The binary representation of the current time TC (that results from the counter 40) is fed into the temporary storage 42, and the adder 44. The temporary storage 42 will be mentioned later as part of another sequence, and the adder 44 will be described in the next step of this sequence.
 3. The adder 44 is continuously receiving the binary representation of the current elapsed time TC and adding to it the fixed input of the advance time interval, TA. This input is typically selected manually at installation by manipulation of voltages by manual operation of timing control switches 54. It is pointed out that while these switches are typically preset manually it is also feasible to operate the switches automatically in response to engine conditions. The output of the addition by the adder 44 is the binary representation of the target time, TC+TA and is fed to the comparator 46.

4. Operation of the comparator is part of another sequence which will be explained hereinafter.

d) The housekeeping for timing of the previous cycle TP. This sequence is triggered by the update pulse generator 34, and corresponds to the storing of the current elapsed time TC, at the instant when each TDC occurs. Sequence explanations and steps are as follows:

1. The temporary storage 42 is continuously receiving the binary data corresponding to the current elapsed time, TC, from the counter 40 output signals. However, these signals are ignored and the state, and output, of the temporary storage 42 remains as it was set (in the previous cycle), until the synchronization signal 37 from the update pulse generator 34 is received.

2. When the update pulse signal 37 is received, the temporary storage 42 "latches in" the binary data input. Thus, the status and output of the temporary storage 42 always includes a binary representation of the time interval between the last received pair of signals, from occurrence of signal 39 (at the time when the counter was last reset) to the consecutive signal 37 (at the time when the input was latched in). This time, the duration of the previous cycle, TP, is equal to the time between the last pair of TDC signals minus 0.2 ms, and is used as a reference by the comparator in the next sequence.

e) The output sequence. This sequence receives inputs from the duration of the previous cycle, TP, and the target time, TC+TA., and determines when to produce the output signal from the device. Sequence explanations and steps are as follows:

1. The comparator 54 is continuously monitoring both binary data inputs mentioned above, and produces a zero output voltage whenever any of the corresponding bits on both binary data inputs are different.

2. At the time when all corresponding bits in both data inputs are equal, the comparator 54 produces a voltage increase signal 47. This voltage increase indicates that the target time, TC+TA, has reached the same value as the duration of the previous cycle, TP, and that ignition must take place at this time.

3. The signal 47 from the previous stage is a rectangular pulse of short duration (typically the clock period, 0.4 ms in this case ) and moderate voltage (typically 6 volts peak). This signal 47 is fed into the output pulse generator 50 which generates a conditioned rectangular pulse 49 of a longer duration, 2 ms. The pulse 49 is fed to an the amplifier 52 for amplification of the pulse to about 12 volts peak which is sufficient to trigger properly the ignition coil 24.

Operation Cycles

The following is a description of two complete operation cycles. It is pointed out that the operation of all stages of the system are continuous and at any given instant several operations are occurring simultaneously.

Each operation cycle takes information from a previous cycle (the duration of the previous cycle, TP). The following describes a pair of cycles. For simplicity, it will be assumed that the system is attached to an engine which is running at a constant speed. All the electronic components have some delays between input and output. These delays are extremely short and will be neglected in the following explanation, except where noted otherwise.

1. The start of the period, cycle number n, occurs when the engine reaches a first TDC position.

2. At this time, t0, the automotive distributor 12 delivers a typical signal which is amplified by the amplifier 30 and fed to the logic timing generator 32.

3. The logic timing generator 32, then (at time tO) starts a rectangular pulse 31 during which the output voltage drops to zero for 0.2 ms.

4. As the rectangular pulse 31 begins, the update pulse generator 34 is instantly triggered by the voltage drop at time tO. However, this event is ignored in the first of the two cycles, for reasons to be explained in the description of the second of the cycles.

5. When the rectangular pulse 31 ends, the reset pulse generator 35 is triggered by the voltage rise at a delayed time tO+0.2 ms. The reset pulse generator 35 produces a very short (0.02 ms) pulse 39 (a voltage increase), which is used to reset the counter 40 to zero.

6. As the reset pulse 39 being fed to the counter 40 ends, at time t0+0.22 ms, the counter 40 begins counting the rectangular pulses 41 from the clock 36, which are received every 0.4 ms.

7. At any given instant during this cycle, the output of the counter 40 maintains binary data (8 bits) that represents the interval of time between the present and the time when the counter was last reset, which reset occurred at time tO+0.22 ms. The binary data can be expressed as a binary number and designated as current elapsed time, TC. This number will be referred to in the following, with the understanding that it represents the state of all the eight bits that are the counter's output.

8. The output from the counter 40 is fed to the adder 44. However, this fact will be ignored for the first of the two cycles, for reasons to be explained hereinafter in the description of the second cycle.

9. The output from the counter 40 (the accumulating time since the last reset pulse 39) is also connected to the input of the temporary storage 42. The temporary storage 42 ignores this input (which is continuously changing as the clock 36 pulses occur) until the update pulse 37 from the update pulse generator 34 is produced, as will be described hereinafter. The device is now running, and the value of TC is increasing in the counter 40 and in the temporary storage 42 input, until a new synchronization signal (pulse 28) is received from the distributor 12.

10. The second half of the period, cycle number n+1, starts when the engine reaches the next TDC position.

11. At time t1=tO+36.5 ms (time relating to given parameters of engine and engine speed) the distributor 12 again sends a pulse 28 to the logic timing generator.

12. The logic timing generator, then (at time t1), starts the rectangular pulse 31 during which the output voltage drops to zero for 0.2 ms.

13. As soon as the rectangular pulse 31 starts, the update pulse generator 34 is instantly triggered by the voltage drop at time t1 and generates the output short pulse 37.

14. This event is now relevant because it triggers the temporary storage 42 to "latch" the input it is receiving, to accept the data of the current TC, store it and put it on the output pins of the temporary storage 42. These binary data correspond to the duration of the previous cycle, TP and will be used as is explained below.

15. When the rectangular pulse 31 from the logic timing generator 32 ends, and the voltage rises again at the delayed time t1+0.2 ms, the reset pulse generator 35 sends pulse 39 that resets the counter in a similar way as described in step 5 above.

16. When the reset pulse to the counter 40 ends, at time t1+0.22 ms, the counter begins counting the rectangular pulses 41 from the clock. These pulses occur every 0.4 ms.

17. At any given instant during this cycle, the output of the counter 40 maintains again the binary data that represents the time interval between the present and the time when the counter was last reset, at time t1+0.22 ms. This interval is the current elapsed time, TC, for the present cycle, n+1. This time TC, will be referred in the following, again with the understanding that it represents the state of all the eight bits that are the counter's output.

18. The output from the counter 40 is connected to the adder 44 which adds the current value of TC to a fixed binary value, TA, that is set with the timing switches 54 (to 4.8 ms in this example, i.e., to twelve times the clock period by setting the timing switches 54 to represent the number twelve). This addition occurs continuously and the result, the target time, TC+TA, starts with the value corresponding to TA and increases thereafter.

19. The system continues updating the target time, TC+TA, until the event in the next stage occurs. The data for TC+TA and for TP are continuously fed into the comparator 46.

20. At some instant the comparator finds that input data (TC+TA) is equal to TP, i.e., that all the corresponding bits in both input data are similar. At this time the output pulse 47 is produced at the output of the comparator 46, which indicates that ignition should be initiated. This occurs at time t1+31.48 ms, i.e., nearly 5 ms before the start of the next cycle, n+1, at the next TDC pulse which occurs at time t1+36.5 ms.

21. The second cycle ends at the occurrence of a third TDC pulse when again the sequence of events repeats.

It will be understood from the above that because the disclosed system is responsive only to TDC pulses which occur during a compression stroke it may be utilized without modification on engines having any number of cylinders, whether the engines be two or four cycle.

Obviously, numerous modifications and variations of the present invention are possible in light of the above teachings. For example, the components within the clock timing loop may be internally time controlled rather than utilizing the illustrated timing arrangement. Further, this system is well suited for the timing of fuel injector systems or other related systems which require a timing control. It is therefore to be understood that within the scope of the appended claims the invention may be practiced otherwise than as specifically described herein.

I claim:

1. An electronic system for controlling timing signals comprising:

means for reception of a train of input signals;

means for providing previous time signals equivalent to the time elapsed between each of said input signals;

means for providing current timed signals indicative of time as it accumulates after initiation of the last occurring of said input signals;

means for increasing the value of each said current timed signals so as to produce resultant accumulated target time signals;

means for comparing each of said previous time signals to one of said accumulated target time signals, and for initiating a timed output signal when one of said accumulated target time signals becomes equal to one of said previous time signals.

2. A system as set forth in claim 1, and further comprising:

means for manually changing the time of occurrence of said timed output signals.

3. A system as set forth in claim 1, and further comprising:

means for changing the time of occurrence of said timed output signals in response to selected timing parameters.

4. An electronic system as set forth in claim 2, and further comprising: means for changing the time of occurrence of said timed output signals in response to selected timing parameters.

5. An electronic timing control system for reception of continuous input pulses delivered by an apparatus, and for generating output pulses in timed relation to the time separation between said input pulses when taken in combination with additive timing control signals, said system comprising:

logic timing means for reception of each said input pulse and for providing an instant update signal and a time delayed reset signal in response thereto;

update pulse generator means for reception of each said update signal, and for providing an update pulse in response thereto;

reset pulse generator means for reception of each said reset signal, and for providing a reset pulse in response thereto;

time controlled temporary storage means, for consecutive reception of said update pulses and said reset pulses and for providing a previous time signal in response to reception of each reset pulse and a following update pulse;

timing means for providing timing control signals;

time controlled adding means for reception of each said reset pulse, for providing accumulating current timing signals in response thereto, and for addition of said timing control signals to said accumulating current timing signals to provide accumulating target time signals;

comparator means for reception of said accumulating target time signals, for reception of said previous time signal, for comparison of said accumulating target time signals to said previous time, and for producing a time controlled output pulse when said accumulating target time becomes equal to said previous time.

6. A system as set forth in claim 5, and further including sensor means adapted for receiving information relating to operating parameters of said apparatus, and in response thereto for changing the timing of said time controlled output pulse.

7. A system as set forth in claim 5, and further including manual means for changing the timing of said time controlled output pulse.

8. A system as set forth in claim 6, and further including manual means for changing the timing of said time controlled output pulse.

9. A system as set forth in claim 8, and further including an output pulse generator means for reception of each said time controlled output pulse and for producing in response thereto a conditioned output pulse suitable for use by said apparatus.

10. An electronic timing control system for reception of a train of input pulses delivered by an apparatus, for generating time controlled output pulses in relation to the time lapse between each of said input pulses and to additional control signals, said system comprising:

means for measuring and storing a previous time which is equivalent to the elapsed time between each of said output pulses;

means for measuring and storing a current time as it accumulates after occurrence of each of said pulses;

means for providing a timing advance value;

means for receiving said current time and said timing advance value and for providing a target time by adding said timing advance value to said current time;

means for comparing said target time to said previous time and for providing a time controlled output pulse when said target time becomes equal to said previous time.

11. A system as set forth in claim 10, and further including sensor means adapted for receiving information relating to operating parameters of said apparatus, and in response thereto for changing the timing of said time controlled output pulse.

12. A system as set forth in claim 10, and further including manual means for changing the timing of said time controlled output pulse.

13. A system as set forth in claim 11, and further including manual means for changing the timing of said time controlled output pulse.

14. A system as set forth in claim 13, and further including an output pulse generator means for reception of said time controlled output pulse and for producing in response thereto a conditioned output pulse suitable for use by said apparatus.

15. An electronic ignition timing control system for electrical connection between the ignition distributor and the spark ignitor of an automotive engine wherein said distributor provides a train of electrical distributor pulses during operation of said automotive engine, said system comprising:

means for amplifying said distributor pulses;

a logic timing generator for reception of each of said amplified pulses and in response thereto, for delivery of a pulse which includes an instantly generated update signal and a time delayed reset signal;

an update pulse generator for reception of said update signal and for providing an update pulse in response thereto;

a reset pulse generator for reception of said reset signal and for providing a reset pulse in response thereto;

an analog voltage controlled clock for providing time marking signals;

a binary counter for reception of said time marking signals, for reception of said reset pulse and for providing elapsed timing signals in response to reception of said reset pulse;

a temporary storage means for reception of said elapsed timing signals, for reception of said update pulse and for providing a previous time signal in response to reception of said update pulse, said previous time signal reflecting the time between reception by said binary counter of said reset pulse and the time of reception by said temporary storage of said update pulse;

a timing switching means for providing selected timing control signals in a format compatible with the timing signals provided by said counter;

an adder means for reception of said timing control signals, for reception of said elapsed timing signals and for adding one to the other so as to provide progressing target time signals;

a comparator for reception of said previous time signal, for the reception of said progressing target time signals, for comparison of said accumulating target time signals to said previous time, and for producing a time controlled output pulse when said accumulating target time signals become equal to said previous time;

an output pulse generator means for reception of said time controlled output pulse and for producing in response thereto a conditioned output pulse suitable for use by the spark ignitor of said automotive engine.

16. A system as set forth in claim 15, and further including sensor means adapted for receiving information relating to operating parameters of said automotive engine, and in response thereto for changing said timing control signals provided by said timing switching so as to change the resultant timing of said time controlled output pulse.

17. A system as set forth in claim 15, and further including sensor means adapted for receiving information relating to operating parameters of said automotive engine, and in response thereto for changing the voltage to said voltage controlled clock so as to change said timing output signal and the resultant timing of said time controlled output pulse.

18. A system as set forth in claim 15, and further including manual means for variation of the voltage to said voltage controlled clock so as to change said timing output signal and the resultant timing of said time controlled output pulse.

19. A system as set forth in claim 18 wherein said manual means is a potentiometer.

20. A system as set forth in claim 15, and wherein said timing switching means is manually operable for changing said timing control signals provided by said timing switches means so as to change the resultant timing of said time controlled output pulse.

* * * * *